United States Patent
Eschenburg et al.

(10) Patent No.: US 8,915,274 B2
(45) Date of Patent: Dec. 23, 2014

(54) SPINDLE FOR CONTROLLING WHEEL END ENDPLAY AND PRELOAD

(75) Inventors: Dale Eschenburg, Rochester Hills, MI (US); David Gonska, Beverly Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 1158 days.

(21) Appl. No.: 12/357,696

(22) Filed: Jan. 22, 2009

(65) Prior Publication Data

US 2010/0181739 A1  Jul. 22, 2010

(51) Int. Cl.
  *B60C 23/10*  (2006.01)
  *B60C 23/00*  (2006.01)

(52) U.S. Cl.
  CPC .................................. *B60C 23/003* (2013.01)
  USPC .......................... 152/416; 301/105.1; 384/544

(58) Field of Classification Search
  USPC ......... 301/105.1, 131; 152/415–417; 384/544
  See application file for complete search history.

(56) References Cited

U.S. PATENT DOCUMENTS

| 2,976,906 | A | * | 3/1961 | Kamm et al. | 152/417 |
|---|---|---|---|---|---|
| 3,362,452 | A | * | 1/1968 | Harnish | 152/416 |
| 4,363,522 | A | * | 12/1982 | Palovcik | 301/131 |
| 4,431,043 | A | * | 2/1984 | Goodell et al. | 152/417 |
| 4,492,019 | A | * | 1/1985 | Wells et al. | 29/447 |
| 5,001,233 | A | * | 3/1991 | Murray et al. | 540/29 |
| 5,080,157 | A | * | 1/1992 | Oerter | 152/417 |
| 5,090,778 | A | * | 2/1992 | Laudszun et al. | 301/105.1 |
| 6,196,727 | B1 | * | 3/2001 | Kawamura | 301/105.1 |
| 6,199,611 | B1 | * | 3/2001 | Wernick | 152/417 |
| 6,254,196 | B1 | * | 7/2001 | Gee | 301/105.1 |
| 6,719,028 | B2 | * | 4/2004 | D'Amico et al. | 152/415 |
| 2010/0147429 | A1 | * | 6/2010 | Gonska et al. | 152/417 |

* cited by examiner

*Primary Examiner* — Jason Bellinger
(74) *Attorney, Agent, or Firm* — Brooks Kushman P.C.

(57) ABSTRACT

A spindle includes an inner bearing shoulder to seat an inner bearing and an outer bearing shoulder to seat an outer bearing. The inner and outer bearing shoulders are spaced apart by a controlled distance such that the outboard bearing is accurately positioned relative to the inboard bearing to control endplay and preload without requiring bearing adjustment.

22 Claims, 1 Drawing Sheet

US 8,915,274 B2

SPINDLE FOR CONTROLLING WHEEL END ENDPLAY AND PRELOAD

TECHNICAL FIELD

The subject invention relates to a spindle supported on a hub for an axle that is configured to control wheel end endplay and preload without the need for bearing adjustment or additional components.

BACKGROUND OF THE INVENTION

A wheel end includes inboard and outboard bearings that are used to rotatably support a wheel hub for rotation relative to a spindle. The process for setting wheel end endplay and bearing preload is difficult and time consuming. One typical process utilizes a precision machined spacer that is positioned between bearing cones of the inboard and outboard bearings in an attempt to accurately control the endplay. This approach has proven to be effective in controlling the endplay; however, the installation of an additional component, i.e. the spacer, increases cost and continues to be time consuming.

Another disadvantage with this type of approach is that the spacer inhibits the installation of a central tire inflation system (CTIS). Typically, the CTIS communicates compressed air through the spindle, into a hub lube cavity, and then out through a wall of the wheel hub. The installation of the spacer between the inboard and outboard bearings blocks any air from passing from the spindle and into the wheel hub.

SUMMARY OF THE INVENTION

A spindle includes an inner bearing shoulder to seat an inner bearing and an outer bearing shoulder to seat an outer bearing. The inner and outer bearing shoulders are spaced apart by a controlled distance such that the outboard bearing is accurately positioned relative to the inboard bearing to control endplay and preload without requiring bearing adjustment.

In one example, a nut is tightened against the outboard bearing such that the outboard bearing comes into contact with the outboard bearing shoulder to prevent excessive preload. Further, the nut does not need to be subsequently backed-off to ensure acceptable endplay because a desired endplay and preload is already provided by the controlled distance between the inboard and outboard bearing shoulders.

In one example, a wheel hub is supported by the inboard and outboard bearings for rotation relative to the spindle. The spindle includes a first air passage in fluid communication with an air source and the wheel hub includes a second air passage that is in fluid communication with a tire. Air is communicated from the air source to the tire through the first air passage, then through an air chamber formed between the wheel hub and spindle, and then into the second air passage.

These and other features of the present invention can be best understood from the following specification and drawings, the following of which is a brief description.

DETAILED DESCRIPTION OF THE PREFERRED EMBODIMENT

Figure 1:
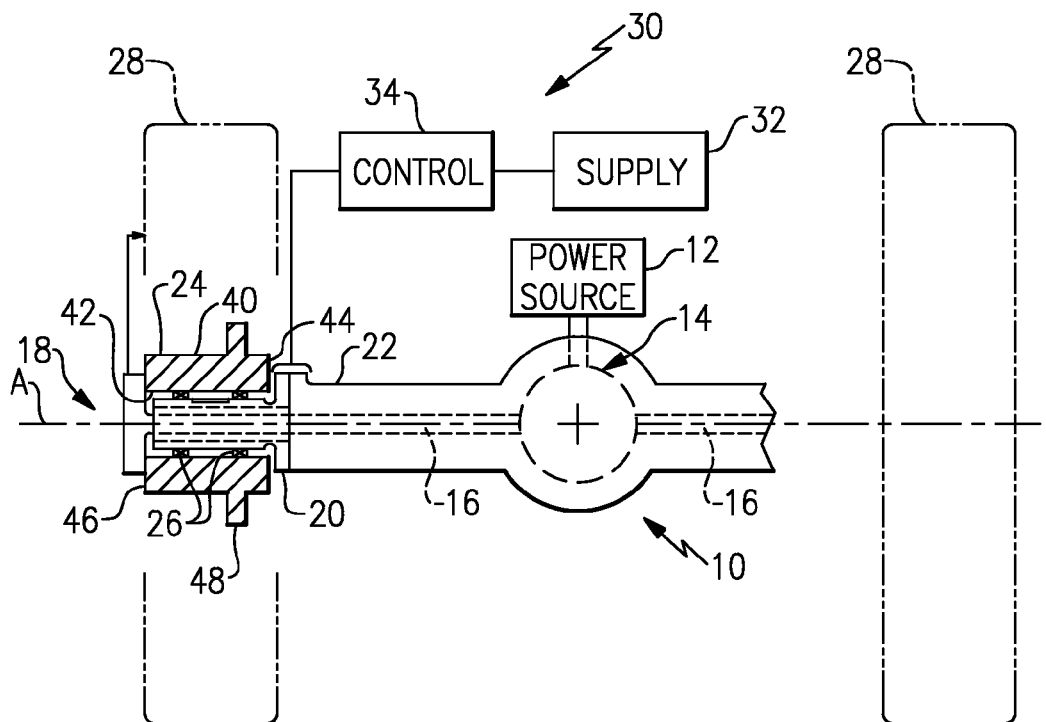
FIG. 1 is a schematic representation of a drive axle assembly in fluid communication with a tire inflation system.

FIG. 1 shows a drive axle 10 receiving driving input from a power source 12, such as an engine or electric motor for example. The driving input drives an input gear assembly 14 that includes a differential mechanism as known. The gear assembly 14 drives axle shafts 16 that are coupled to drive wheel end assemblies 18. One example of a wheel end assembly 18 is shown to the left of FIG. 1. It should be understood that the opposite wheel end assembly 18 would be similarly configured.

The wheel end assembly 18 includes a non-rotating spindle 20 that is mounted to an axle housing 22 or other non-rotating axle structure. The axle housing 22 houses the gear assembly 14 and axle shafts 16. A wheel hub 24 is rotatably supported on the spindle 20 by bearings 26. In one example, the bearings 26 comprise half-stand bearings (with reduced tolerance); however, other types of bearings could also be used. A tire 28 and associated rim are mounted for rotation with the wheel hub 24 about an axis A.

A tire inflation system 30 includes an air supply tank or air source 32 that is used to supply air to the tires 28 when the tires 28 become under-inflated. The tire inflation system 30 includes a control 34 that determines when air is to be supplied and also controls the amount of air supplied as known. The control 34 can be automatically activated via an electronic control unit or other similar device to control the amount of air supplied, or the control 34 can be manually actuated by a vehicle operator. The control 34 can include various valves, sensors, pressure regulators, etc. as known to control distribution of the air from the air source 32. The control 34 is also configured to stop supplying air to a tire 28 if pressure falls below a certain level to prevent the air source 32 from being depleted of air, such as when a tire 28 has experienced a blow-out for example.

Figure 2:
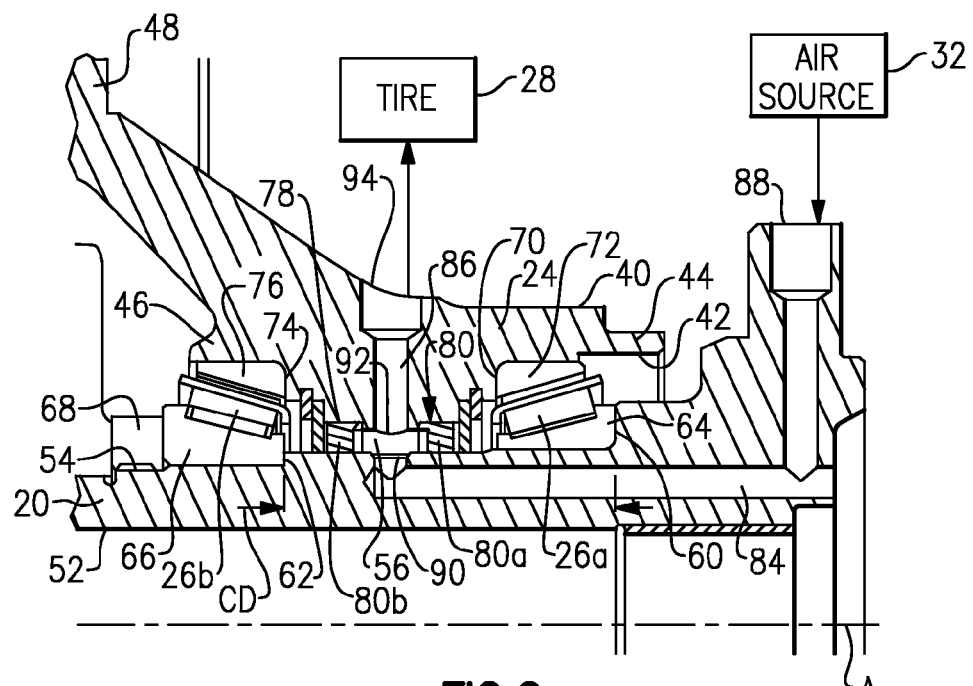
FIG. 2 is a partial cross-sectional view of one example of a wheel end assembly as used with the tire inflation system.

The control 34 supplies air to the wheel end assembly 18, which includes passages that convey the air to the tire 28. FIG. 2 shows one example of a wheel end assembly 18 as used with the tire inflation system 30. It should be understood that while the wheel end assembly is shown with a drive axle in FIG. 1, the wheel end assembly could be used with other types of axles such as non-drive or steering axles, for example.

The wheel hub 24 includes an outer peripheral surface 40 and an inner peripheral surface 42 that surround the axis of rotation A. The wheel hub 24 also includes an inboard end 44 and an outboard end 46 with a mounting flange portion 48 that can be used to mount other brake or wheel structures.

As shown in FIG. 2, the spindle 20 includes a spindle body having an inner peripheral surface 52 and an outer peripheral surface 54. The bearings 26 include an inboard bearing 26a and an outboard bearing 26b that support the wheel hub 24 for rotation relative to the spindle 20. The term "inboard" refers to a direction that is toward a vehicle center and the term "outboard" refers to a direction that is away from a vehicle center. An air chamber 56 is formed between the spindle 20 and the wheel hub 24. The air chamber 56 is bounded by the inner peripheral surface 42 of the wheel hub 24, the outer peripheral surface 54 of the spindle 20, and a seal assembly 80 positioned adjacent to the inboard 26a and outboard 26b bearings.

The spindle 20 includes an inboard bearing shoulder 60 and an outboard bearing shoulder 62 that are machined or formed about the outer peripheral surface 54 of the spindle 20. An inboard bearing cone 64 is seated against the inboard bearing shoulder 60 and an outboard bearing cone 66 is seated against the outboard bearing shoulder 62. The inboard 60 and outboard 62 bearing shoulders are axially spaced apart from each other by a controlled distance CD such that the outboard bearing 26b is accurately positioned relative to the inboard bearing 26a to control endplay and preload without requiring bearing adjustment or any other additional components. A spindle nut 68 is tightened against the outboard bearing cone 66 to bring the outboard bearing cone 66 into contact with the outboard bearing shoulder 62 such that excessive preload is prevented. Further, this spindle nut 68 does not need to be backed-off to ensure acceptable endplay because acceptable endplay is already provided by the controlled distance CD.

The outer peripheral surface 54 of the spindle 20 is defined by a stepped profile that includes the inboard 60 and outboard 62 bearing shoulders. The inboard bearing shoulder 60 is formed at a spindle portion that has a greater diameter than the spindle portion at which the outboard bearing shoulder 62 is located.

The wheel hub 24 includes an inboard shoulder 70 to seat a cup 72 of the inboard bearing 26a and includes an outboard shoulder 74 to seat a cup 76 of the outboard bearing 26b. The wheel hub 24 includes a protruding portion 78 between the inboard shoulder 70 and outboard shoulder 74 that extends into the air chamber 56. Air from the air source 32 is communicated through the spindle 20 into the air chamber 56, then into the wheel hub 24, and then out to the tire 28. The protruding portion 78 of the wheel hub 24 and the outer peripheral surface 54 of the spindle 20 include surfaces to seat the seal assembly 80 to provide the sealed air chamber 56.

The seal assembly 80 includes an inboard seal 80a positioned immediately adjacent the inboard bearing 26a and an outboard seal 80b positioned immediately adjacent the outboard bearing 26b. The inboard 80a and outboard 80b seals can each be comprised of a single sealing member or can be comprised of a plurality of sealing members that cooperate together to provide a seal assembly. In one example, the inboard 80a and outboard 80b seals are double lip seals with one lip to seal air and the other lip to seal lubricant for lubricating the bearings. In another example, separate air seals and lubricant seals could also be used.

The spindle 20 includes a first air passage 84 and the wheel hub 24 includes a second air passage 86. The first air passage 84 has an inlet 88 in fluid communication with the air source 32 and an outlet 90 in fluid communication with the air chamber 56. The outlet 90 is generally centrally located between the inboard 26a and outboard 26b bearings. The second air passage 86 includes an inlet 92 in fluid communication with the air chamber 56 and an outlet 94 in fluid communication with the tire 28. The inlet 92 is generally centrally located between the inboard 26a and outboard 26b bearings.

To assemble the wheel end assembly, the inboard bearing 26a is first installed on the spindle 20 to contact the inboard bearing shoulder 60, and then the seal assembly 80 is installed to define the air chamber 56. Next the outboard bearing 26b is installed and the spindle nut 68 is tightened against the outboard bearing 26b to bring the outboard bearing 26b into contact with the outboard bearing shoulder 62. As discussed above, the seal assembly 80 can include both air and lubricant sealing features, or separate lubricant and air seals could be used as needed.

As discussed above, the outboard bearing shoulder 62 is machined on the spindle 20 to accurately position the outboard bearing cone 66 relative to the inboard bearing shoulder 60 on the spindle 20. When combined with tighter tolerances on the hub bearing to bearing shoulders, i.e. the controlled distance CD, the result is an accurately controlled endplay and preload with no need for bearing adjustment or additional components. Further, air passage from the spindle 20 to the wheel hub 24 is unobstructed due to the elimination of the previously required spacer.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A spindle for a vehicle axle comprising:
   a body having an inboard end and an outboard end, said body having an outer peripheral surface;
   an air passage formed within said body, said air passage having an inlet to be associated with a pressurized air source;
   an inboard bearing shoulder formed about said outer peripheral surface adjacent said inboard end of said body to seat an inboard cone of an inboard bearing;
   an outboard bearing shoulder formed about said outer peripheral surface to seat an outboard cone of an outboard bearing wherein said inboard cone is in direct abutting engagement with said inboard bearing shoulder and said outboard cone is in direct abutting engagement with said outboard bearing shoulder; and
   wherein said outboard bearing shoulder is spaced axially outboard of said inboard bearing shoulder by a predetermined distance such that the outboard bearing is positioned relative to the inboard bearing to control endplay and preload without requiring bearing adjustment.

2. The spindle according to claim 1 wherein said inboard bearing shoulder is defined by a greater diameter than said outboard bearing shoulder, and including a spindle nut that directly engages said outboard cone of said outboard bearing to move said outboard bearing into direct contact with said outboard bearing shoulder.

3. The spindle according to claim 1 wherein said air passage has an outlet to said outer peripheral surface at a position between said inboard and said outboard bearing shoulders.

4. A wheel end assembly comprising:
   a wheel hub rotatable about an axis;
   inboard and outboard bearings to rotatably support said wheel hub;
   a spindle having an inboard shoulder that directly abuts an inboard bearing cone of said inboard bearing and an outboard shoulder that directly abuts an outboard bearing cone of said outboard bearing; and
   an air passage formed within said spindle, said air passage having an inlet to be associated with a pressurized air source.

5. The wheel end assembly according to claim 4 wherein an air chamber is bounded by an outer peripheral surface of said spindle, an inner peripheral surface of said wheel hub, and said inboard and outboard bearings, and including at least one seal positioned within said air chamber to allow air to be communicated from said spindle to said wheel hub through said air chamber.

6. The wheel end assembly according to claim 5 wherein said air passage comprises a first air passage that has a spindle outlet in communication with said air chamber, and wherein said wheel hub includes a second air passage having a wheel hub inlet at said air chamber and a wheel hub outlet to be in communication with a tire.

7. The wheel end assembly according to claim 6 wherein said at least one seal comprises a first seal positioned immediately adjacent said inboard bearing and a second seal positioned immediately adjacent said outboard bearing, and wherein said spindle outlet and said wheel hub inlet are positioned axially between said first and said second seals.

8. The wheel end assembly according to claim 4 including a spindle nut that is tightened directly against said outboard bearing cone of said outboard bearing to axially clamp said outboard bearing cone in direct abutting engagement against said outboard bearing shoulder.

9. A method of assembling a wheel end comprising:
(a) providing a spindle having an inboard bearing shoulder, an outboard bearing shoulder, and an air passage formed within the spindle that has an inlet to be associated with a pressurized air source;
(b) installing an inboard bearing cone of an inboard bearing directly against the inboard bearing shoulder;
(c) installing an outboard bearing cone of an outboard bearing directly against the outboard bearing shoulder; and
(d) tightening a spindle nut against the outboard bearing to bring the outboard bearing cone into contact with the outboard bearing shoulder.

10. The method according to claim 9 including installing at least one central tire inflation seal onto the spindle prior to step (c).

11. The method according to claim 10 wherein the at least one central tire inflation seal comprises an inboard seal and an outboard seal, and including positioning the inboard seal immediately adjacent the inboard bearing and axially spacing the outboard seal from the inboard seal to be immediately inboard of the outboard bearing shoulder.

12. The method according to claim 11 including communicating air through the air passage in the spindle, then into an air chamber defined by the inboard and outboard seals, then into a wheel hub supported by the inboard and outboard bearings for rotation relative to the spindle, and then into a tire.

13. The method according to claim 9 including machining the spindle to space the inboard and outboard bearing shoulders apart from each other by a controlled distance that provides an inner bearing shoulder to outer bearing shoulder tolerance configuration that sets a desired endplay and preload without requiring subsequent bearing adjustment.

14. The method according to claim 9 wherein step (d) includes tightening the spindle nut directly against the outboard bearing cone such that the outboard bearing cone is in direct abutting engagement with said outboard bearing shoulder.

15. The method according to claim 9 including rotatably supporting a wheel hub on the inboard and outboard bearings, providing the spindle with an outer peripheral surface, providing the wheel hub with an inner peripheral surface, installing an inboard seal to directly contact the inner and outer peripheral surfaces, installing an outboard seal to directly contact the inner and outer peripheral surfaces, and forming an air chamber directly bounded by the outer peripheral surface of the spindle, the inner peripheral surface of the wheel hub, and the inboard and outboard seals.

16. The method according to claim 15 including forming a protruding portion on the inner peripheral surface of the wheel hub that extends radially inward toward the outer peripheral surface of the spindle at a location between the inboard and outboard bearings, the protruding portion providing an inboard seal seat and an outboard seal seat, and including forming a wheel hub air passage in the protruding portion that receives air from the air chamber, the inboard and outboard seal seats being positioned on opposite sides of the wheel hub air passage.

17. The method according to claim 9 wherein the inner and outer bearings support a wheel hub for rotation about an axis and including forming the inboard and outboard bearing shoulders as first and second stepped surfaces that extend in a radial direction that is perpendicular to the axis and with the first and second stepped surfaces being parallel to each other.

18. The spindle according to claim 1 wherein said the outboard bearing shoulder comprises a machined surface on said body that is machined at said predetermined distance away from said inboard bearing shoulder such that said predetermined distance is a controlled distance that provides an inner bearing shoulder to outer bearing shoulder tolerance configuration that sets endplay and preload without requiring subsequent bearing adjustment.

19. The spindle according to claim 1 wherein the inner and outer bearings are adapted to support a wheel hub for rotation about an axis and wherein said inboard and outboard bearing shoulders are first and second stepped surfaces that extend in a radial direction that is perpendicular to the axis and wherein said first and second stepped surfaces are parallel to each other.

20. The wheel end assembly according to claim 4 wherein said spindle has an outer peripheral surface and said wheel hub has an inner peripheral surface, and including an inboard seal that directly contacts said inner and outer peripheral surfaces and an outboard seal that directly contacts said inner and outer peripheral surfaces, and including a sealed air chamber that is directly bounded by said outer peripheral surface of said spindle, said inner peripheral surface of said wheel hub, and said inboard and outboard seals.

21. The wheel end assembly according to claim 20 wherein said wheel hub includes a protruding portion that extends radially inward from said inner peripheral surface toward said outer peripheral surface of said spindle at a location between said inboard and outboard bearings, said protruding portion providing an inboard seal seat and an outboard seal seat, and wherein said wheel hub includes a wheel hub air passage formed in said protruding portion that receives air from said sealed air chamber, said inboard and outboard seal seats being positioned on opposite sides of said wheel hub air passage.

22. The wheel end assembly according to claim 4 wherein said inner and outer bearings support a wheel hub for rotation about an axis and wherein said inboard and outboard bearing shoulders comprise first and second stepped surfaces that extend in a radial direction that is perpendicular to said axis and wherein said first and second stepped surfaces are parallel to each other.

* * * * *